US008605651B2

(12) United States Patent
Bertani et al.

(10) Patent No.: US 8,605,651 B2
(45) Date of Patent: Dec. 10, 2013

(54) METHOD FOR AUTOMATIC SELECTION OF A MAC PROTOCOL FOR A COMMUNICATION SYSTEM AND RELATED SYSTEM

(75) Inventors: Torquato Bertani, Milan (IT); Lorenzo Bianconi, Spicchio-Vinci (IT); Alessandro Erta, Milan (IT); Umberto Malesci, Milan (IT)

(73) Assignee: Fluidmesh Networks, LLC, Buffalo Grove, IL (US)

( * ) Notice: Subject to any disclaimer, the term of this patent is extended or adjusted under 35 U.S.C. 154(b) by 255 days.

(21) Appl. No.: 12/693,339

(22) Filed: Jan. 25, 2010

(65) Prior Publication Data

US 2010/0189005 A1 Jul. 29, 2010

(30) Foreign Application Priority Data

Jan. 27, 2009 (EP) .................................... 09001072

(51) Int. Cl.
*H04L 12/26* (2006.01)
(52) U.S. Cl.
USPC .......................................... 370/328; 370/408
(58) Field of Classification Search
USPC .............. 370/396, 395.5, 408, 437, 445, 392, 370/328
See application file for complete search history.

(56) References Cited

U.S. PATENT DOCUMENTS

| | | | |
|---|---|---|---|
| 5,012,469 A | 4/1991 | Sardana | |
| 5,661,727 A * | 8/1997 | Kermani et al. | 370/445 |
| 5,896,561 A | 4/1999 | Schrader et al. | |
| 6,275,497 B1 | 8/2001 | Varma et al. | |
| 7,502,354 B1 | 3/2009 | Maufer | |
| 7,835,301 B1 * | 11/2010 | Maufer | 370/254 |
| 7,872,989 B1 * | 1/2011 | Tong et al. | 370/254 |
| 8,159,984 B1 * | 4/2012 | Loc et al. | 370/312 |
| 2006/0268908 A1 | 11/2006 | Wang et al. | |
| 2007/0189191 A1 * | 8/2007 | Ades | 370/254 |

FOREIGN PATENT DOCUMENTS

| | | |
|---|---|---|
| WO | 02/078229 | 10/2002 |
| WO | 2006/068295 | 6/2006 |
| WO | 2008/132702 | 11/2008 |

OTHER PUBLICATIONS

"Design and Analysis of a Leader Election Algorithm for Mobile Ad Hoc Networks," Sudarshan Vasudevan et al. IEEE Computer Society, 1092-1648/04 (2004).
"An Integrated Multi-hop Cellular Data Network," Hyunjeong Lee et al. IEEE 0-7803-7954-3, pp. 2232-2236 (2003).
"An Adaptive RTS/CTS Control Mechanism for IEEE 802.11 MAC Protocol," Huei-Jium Ju et al. University of California, Los Angeles (2003).
"Dynamic Adaption of DCF and PCF mode of IEEE 802.11 WLAN," Abhishek Goliya, Indian Institute of Technology, Bombay (2003).
"Mobile ad hoc networking: imperatives and challenges," Imrich Chlamtac et al., Ad Hoc Networks 1:13-64 (2003).

(Continued)

*Primary Examiner* — Thai Nguyen

(74) *Attorney, Agent, or Firm* — Patzik, Frank & Samotny Ltd.

(57) ABSTRACT

MAC protocol selection is described. In a communication system, a MAC protocol is automatically selected from a set of MAC protocols based on a connectivity graph of at least part of the communication system.

13 Claims, 10 Drawing Sheets

(56) References Cited

OTHER PUBLICATIONS

"A Load Awareness Medium Access Control Protocol for Wireless Ad Hoc Network," Chih-Min Chao et al., IEEE 0-7803-7802-4, pp. 438-442 (2003).

"Comparative Performance Evaluation of Scatternet Formation Protocols for Networks of Bluetooth Devices," Stefano Basagni et al., Wireless Networks 10, 197-213 (2004).

Doerr, Christian, et al., MultiMAC—An Adaptive MAC Framework for Dynamic Radio Networking, IEEE DySPAN, pp. 548-555, 2005, Baltimore Maryland.

European Patent Office, International Preliminary Report on Patentability and Written Opinion of the International Searching Authority, dated Aug. 2, 2011, issued in connection with applicant's related International Application No. PCT/EP2009/008712.

* cited by examiner

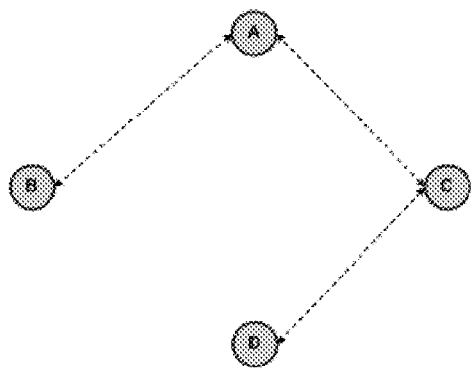
*Fig. 14*
*Fig. 15*
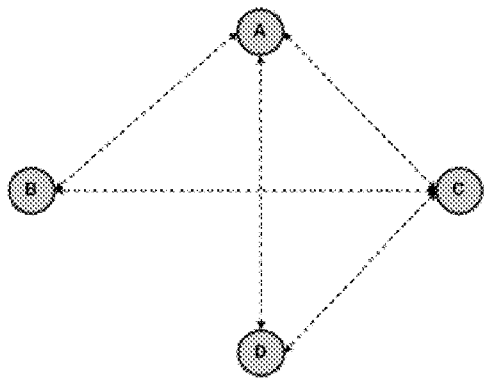
*Fig. 16*
*Fig. 17*

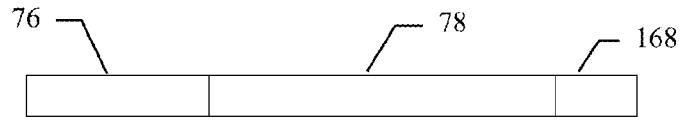
*Fig. 18*
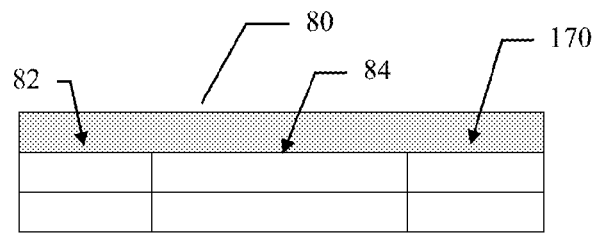
*Fig. 19*
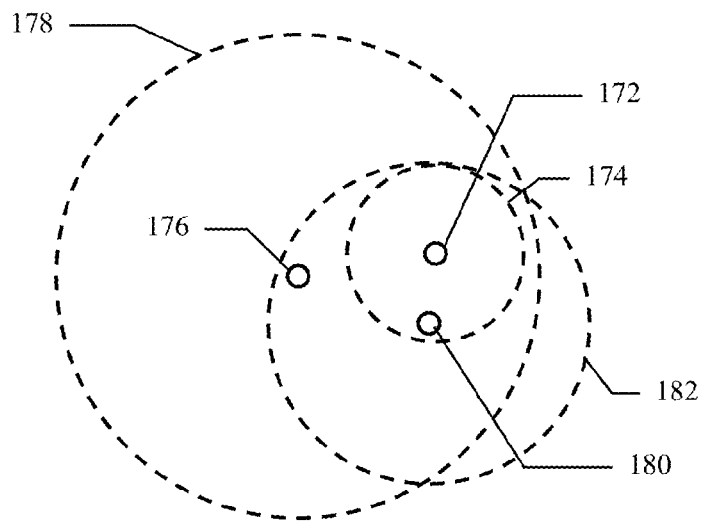
*Fig. 20*
| 172 | 176, 180 |
|---|---|
*Fig. 21*
| Node's 172 LoN ||
|---|---|
| 176 | 180 |
| 180 | 172, 176 |
*Fig. 22*

METHOD FOR AUTOMATIC SELECTION OF A MAC PROTOCOL FOR A COMMUNICATION SYSTEM AND RELATED SYSTEM

CROSS REFERENCE TO RELATED APPLICATIONS

The present application claims priority to European patent application no. 09001072.9 filed on Jan. 27, 2009, which is incorporated herein by reference in its entirety.

FIELD

The present disclosure relates generally to communication systems and in particular to such communication systems where there is at least one shared resource, in particular wherein the transmission medium is shared, and a Medium Access Control (MAC) protocol is needed. More specifically, embodiments of the present disclosure relate to a method of operating a communication system, a communication node for use in a communication system, and a communication system.

BACKGROUND

It is increasingly common to interconnect several fixed and mobile electronic appliances, such as computers and peripherals therefor, handheld digital devices like personal digital assistants and cell phones, data collection devices and sensors for example for area videosurveillance, and so on. Said devices comprise the nodes or stations or units or terminals of the communication system. Term network will sometimes be used herein as a synonymous of term communication system.

Such networks can be of various geographical size, ranging from BAN (Body Area Network), PAN (Personal Area Network), LAN (Local Area Network), MAN (Metropolitan Area Network), to WAN (Wide Area Network).

The connection or links among the nodes may exploit several physical media, such as electric wires, buses and optical fiber, as well as wireless media such as radio frequency and infrared electromagnetic radiation.

While wired communication systems are still broadly used, wireless and hybrid type communication systems are increasingly common due to their flexibility of installation, allowing for mobile devices to interconnect with each other and/or with an infrastructure.

Besides the physical medium, to effectively allow exchange of information, the nodes of a communication system should share a network protocol, including e.g. the formats of data packets and node addresses. Where the transmission medium is shared, a Medium Access Control (MAC) protocol is also needed to allow for all nodes to successfully communicate within the system, avoiding colliding communications to the greatest possible extent.

Several Medium Access Control (MAC) protocols are well known in the art.

In centralized MAC protocols, a central node coordinates all the communication among the other nodes—and possibly itself—in the communication system. On the other hand, distributed MAC protocols provide for distributed coordination among the nodes themselves. Hybrid MAC protocols are also known.

For example, the common and widely deployed Institute of Electrical and Electronics Engineers (IEEE) 802.11 standard for wireless networks, commercially known as Wi-Fi (Wireless Fidelity), provides a distributed MAC protocol, namely Distributed Coordination Function (DCF), where the access to the physical medium is arbitrated by a random contention among the wireless nodes. Briefly stated, each node only transmits when it senses the medium free. Such MAC protocol suffers from the well-known hidden node and exposed node problems.

With reference to FIG. 1, consider a communication system having nodes 10, 12, 14, 16 and respective transmission ranges 18, 20, 22, 24. The transmission ranges partly overlap so that there is a link 26 between nodes 10 and 12, a link 28 between nodes 12 and 14, and a link 30 between nodes 14 and 16, but no links between nodes 10 and 14. Both nodes 10 and 14, when wishing to communicate towards node 12, being hidden to each other, will sense the medium free and start communication. A communication collision will however occur at node 12. To alleviate such problem, the DCF protocol of the IEEE 802.11 standard itself incorporates an optional mechanism based on the exchange of RTS/CTS (Request To Send/Clear To Send) messages for reserving the communication medium. According to this embodiment of the DCF protocol, node 10 transmits a short RTS message to node 12, and node 12 transmits in reply a short CTS message, both messages indicating the duration of the desired communication from node 10 to node 12. Node 14, receiving the CTS message, will refrain from communicating to node 12 for such duration.

Again with reference to FIG. 1, the exposed node problem arises when node 12 is transmitting to node 10. Node 14 will sense the medium busy and refrain from transmitting to node 16, even if no collision would occur at either nodes 10 and 16. The communication system's performance is therefore deteriorated.

The IEEE 802.11 standard further provides for a MAC protocol, namely Point Coordination Function (PCF), according to which a "master" node grants centralized scheduled access to "slave" nodes in a poll list during a period (CFP) alternating with a period (CP) in which the rules of the DCF protocol are used, and nodes may request to be added to the poll list. Thus, IEEE 802.11 PCF standard is a partly centralized and partly distributed MAC protocol, i.e. a hybrid MAC protocol as term "hybrid" is used herein. The Applicant notes that PCF is optional, and only very few Access Points (APs) or Wi-Fi adapters actually implement it.

An example of a centralized MAC protocol is the IEEE 802.16 standard, commercially known as WiMAX, where all the communications occur only from the Base Station (BS) acting as master to the Subscriber Stations (SSs) acting as slaves and viceversa in a polling fashion. This approach naturally prevents hidden node or exposed node problems from occurring. However, no direct communication is possible between any two SSs, even if they are within the transmission range of each other and could therefore hear each other directly. This constraint may negatively impact on the system performance and efficiency.

Another example of a centralized MAC is the Bluetooth protocol, wherein a node may become either a slave or the master of up to eight slave nodes, granting them access to the medium in a polling fashion.

While in some communication systems or networks the choice of which node is to act as the master of a centralized MAC protocol is dictated by the network structure, purpose and/or nature, in ad hoc networks of peer nodes any node may in principle be elected as the master. Several algorithms and approaches for master election have been proposed in a wide variety of contexts.

Besides the IEEE 802.11 PCF protocol, other hybrid MAC protocols have been proposed to improve performance of communication systems.

Furthermore, there is often the need to easily establish a communication system among mobile nodes, or nodes to be fixedly deployed without the knowledge a priori of the connectivity graph or physical topology.

The Applicant faced the problem of providing for automatic selection of a MAC protocol that increases a communication system's performance.

SUMMARY

In an aspect thereof, the present disclosure relates to a communication node for use in a communication system, comprising: modules adapted to be provided with a connectivity graph of at least part of the communication system, to analyze said connectivity graph, and to select a Medium Access Control (MAC) protocol from a set of at least two MAC protocols based on said connectivity graph, and modules adapted to communicate over a medium operating according with the selected MAC protocol.

By automatically selecting the MAC protocol based on the connectivity graph, the communication node can easily self-configure according to the actual communication system.

Said modules may be adapted to select a MAC protocol from said set based on whether the connectivity graph is fully connected, or not.

Alternatively or additionally, said modules may be adapted to select a MAC protocol from said set based on whether according to the connectivity graph there is at least one communication node that is fully connected to every other communication node, or not.

The MAC protocols set may include at least one MAC protocol of a distributed type without reservation.

The at least one MAC protocol of a distributed type without reservation may be selected from the group consisting of IEEE 802.11 standard DCF protocol without RTS/CTS, Distributed Foundation Wireless MAC (DFWMAC), Elimination Yield-Non-Preemptive Priority Multiple Access (EY-NPMA), that are well-known in the art, and any custom MAC protocol of a distributed type without reservation.

Alternatively or additionally, the MAC protocols set may include at least one MAC protocol of a distributed type with reservation.

The at least one MAC protocol of a distributed type with reservation may be selected from the group consisting of the IEEE 802.11 standard DCF protocol with RTS/CTS, the Busy Tone Multiple Access (BTMA), the Floor Acquisition Multiple Access (FAMA), the Floor Acquisition Multiple Access with Non-persistent Carrier Sensing (FAMA-NCS), and the Floor Acquisition Multiple Access with Non-persistent Packet Sensing (FAMA-NPS), that are well-known in the art, and any custom MAC protocol of a distributed type with reservation.

Alternatively or additionally, the MAC protocols set may include at least one MAC protocol of a centralized type.

In the present description and in the attached claims, the term "Centralized MAC protocol" is broadly used to also encompass hybrid MAC protocols, as far as they also require a master.

The at least one centralized or hybrid MAC protocol may be selected from the group consisting of the IEEE 802.11 standard PCF protocol, the Idle Sense Multiple Access (ISMA), the Randomly Addressed Polling (RAP), the Resource Auction Multiple Access (RAMA), the Disposable Token MAC Protocol (DTMP), the Random Reservation Protocols (RRA), the Packet Reservation Multiple Access (PRMA), the Random Reservation Access-Independent Stations Algorithm (RRA-ISA), that are well-known in the art, and any custom MAC protocol of a centralized or hybrid type.

The communication node may be any electronic appliance, either mobile or fixedly installed.

The communication node can be a fixedly installed wireless router adapted, for example, for the connection of video surveillance appliances.

The communication medium may be any physical medium, and the communication medium can be air, i.e. the communication system can be wireless.

The wireless communication medium can be a radio frequency band.

The communication system may be of any size, and, for example, a LAN, such as a W-LAN or a WAN.

The connectivity graph can comprise information, e.g. a record, for each neighbor node of the communication node, comprising a unique identifier of the communication node's neighbor node and a list of unique identifiers of every neighbor node of the neighbor node.

The above connectivity graph is local to the node, i.e. it is of part of the communication system only, in particular it is limited to one-hop neighbors. This provides simplicity of implementation, especially when the connectivity graph is automatically inferred by the communication node.

However, the connectivity graph may also comprise, for each neighbor node of said list, a secondary list of unique identifiers of every neighbor node of said neighbor node of the list, and possible further nested lists.

The modules adapted to be provided with a connectivity graph of at least part of the communication system may be adapted to receive said connectivity graph as input from an entity external to the communication node.

Alternatively or additionally, the modules adapted to be provided with a connectivity graph of at least part of the communication system may be adapted to retrieve or download said connectivity graph from said communication system.

The modules adapted to be provided with a connectivity graph of at least part of the communication system may be adapted to automatically infer said connectivity graph.

The modules adapted to automatically infer said connectivity graph can be adapted to: receive a message from at least one neighbor node of the communication system, said message comprising the unique identifier of the communication node's neighbor node, and the list of unique identifiers of every neighbor node of the neighbor node, and store the information comprised in the message(s) received from all neighbor nodes of the communication node.

The modules can be adapted to analyze said connectivity graph by comparing each of said lists with (i) the unique identifier(s) of the communication node's neighbor node(s) and (ii) a unique identifier of the communication node, and to qualify the connectivity graph as not fully connected in case at least one of said lists contains at least one unique identifier different from (i) the unique identifier(s) of the communication node's neighbor node(s) and (ii) the unique identifier of the communication node.

Alternatively or additionally, said modules are adapted to analyze said connectivity graph by comparing each of said lists with (i) the unique identifier(s) of the node's neighbor node(s) and (ii) a unique identifier of the communication node, and to qualify the connectivity graph as fully connected in case none of said lists contains unique identifier(s) different from (i) the unique identifier(s) of the communication node's neighbor node(s) and (ii) the unique identifier of the communication node.

In case the lists of neighbors are nested, all nested lists may also be compared with the unique identifier(s) of the node's neighbor node(s) and with a unique identifier of the communication node, and/or with each other.

The unique identifiers can be selected from the group comprised of a MAC address, an IP address, and a combination thereof.

The connectivity graph may also comprise, besides said unique identifiers, information relating to each communication node's aptitude to behave as a master in case a centralized MAC protocol is selected, such as an hardware version and similar.

In order to allow operation of the connectivity graph inferring modules of other nodes of the communication system, the communication node may further comprise modules adapted to broadcast a message, said message comprising (i) a unique identifier of the communication node and (ii) a list of unique identifier(s) of every neighbor node of the communication node.

The modules can be adapted to periodically broadcast said message.

Again, nested lists of neighbors may be comprised in said message.

The connectivity graph can be time-variant.

The communication node may further comprise modules adapted to retrieve from the communication system said set of at least two MAC protocols, or said selected MAC protocol.

The communication node can further comprise role election modules.

In the present description and in the attached claims, the term "role election" is defined as the selection to behave as either the master or a slave in a selected centralized or hybrid MAC protocol.

The message broadcasted by said modules adapted to broadcast a message can further include information on a supposed master of the communication system.

The communication node may comprise further modules adapted to communicate over at least one further communication medium or channel.

The further communication medium or channel may be used totally independently of the communication medium or medium channel over which said MAC protocol is operated, or it can be used for communicating the messages from which the communication nodes infer the connectivity graph, and/or for communicating the MAC protocol(s).

In another aspect thereof, the present disclosure relates to a communication system comprising a plurality of communication nodes as detailed above.

In such a communication system, therefore, each node is self-configuring.

In another aspect thereof, the present disclosure relates to a method of operating a communication system, comprising the steps of: a) providing at least one communication node of the communication system with a connectivity graph of at least part of the communication system, b) analyzing at said at least one communication node said connectivity graph, c) selecting at said at least one communication node a Medium Access Control (MAC) protocol from a set of at least two MAC protocols based on said analyzed connectivity graph, and d) operating said communication system with the selected MAC protocol.

Steps a), b), and c) can be carried out for each communication node of the communication system.

The step of analyzing can comprise establishing whether the connectivity graph is fully connected or not.

Alternatively or additionally, said step of analyzing comprises establishing whether according to the connectivity graph there is at least one communication node that is fully connected to every other communication node, or not.

The step of providing at least one communication node of the communication system with a connectivity graph can comprise providing information, e.g. a record, for each neighbor node of the communication node, comprising a unique identifier of the communication node's neighbor node and a list of unique identifier(s) of every neighbor node of the neighbor node.

Said step of providing at least one communication node of the communication system with a connectivity graph may comprise inputting said connectivity graph from an entity external to the communication node.

Alternatively or additionally, the step of providing at least one communication node of the communication system with a connectivity graph may comprise retrieving said connectivity graph into said at least one communication node from said communication system.

Alternatively or additionally, the step of providing at least one communication node of the communication system with a connectivity graph may comprise automatically inferring said connectivity graph.

The step of automatically inferring such connectivity graph can comprise receiving at said at least one communication node a message from at least one neighbor node of the communication node, said message comprising a unique identifier of the communication node's neighbor node and a list of unique identifier(s) of every neighbor node of the neighbor node, and storing at said at least one communication node the information comprised in the message(s) received from all neighbor node(s) of the communication node.

The step of analyzing said connectivity graph can comprise comparing each of said lists with the unique identifier(s) of the communication node's neighbor node(s) and with a unique identifier of the communication node, and qualifying the connectivity graph as not fully connected in case at least one of said lists contains at least one unique identifier different from the unique identifier(s) of the communication node's neighbor node(s) and from the unique identifier of the communication node.

Alternatively or additionally, said step of analyzing said connectivity graph comprises comparing each of said lists with the unique identifiers of the communication node's neighbor node(s) and with a unique identifier of the communication node, and qualifying the connectivity graph as fully connected in case none of said lists contains unique identifiers different from the unique identifier(s) of the communication node's neighbor node(s) and from the unique identifier of the communication node.

The method can further comprise the step of providing to said at least one communication node information relating to each communication node's aptitude to behave as a master in case a centralized MAC protocol is selected.

The method can comprise the step of detecting a change in said connectivity graph and repeating said steps a) to d) following said change detection.

The method can further comprise the step of waiting until the connectivity graph becomes stable after the detected change, before repeating said steps a) to d).

The method can further comprise the step of electing a master when said selected MAC protocol is of a centralized type.

The steps of providing the connectivity graph and of operating the communication system with the selected MAC protocol may be carried out over different communication media or channels.

Embodiments of the present disclosure apply in general to all types of communication systems, and are of particular interest for Wireless LANs (WLANs) and Wireless MANs, including the emerging Wireless Mesh Networks (WMNs).

BRIEF DESCRIPTION OF THE DRAWINGS

Further features of the present disclosure shall become clearer from the following detailed description of some embodiments thereof, provided with reference to the attached drawings. In the drawings:

FIG. 14 shows another exemplary communication system;

FIG. 15 shows a connectivity graph representation of a communication node of the communication system of FIG. 14;

FIG. 16 shows another exemplary communication system;

FIG. 17 shows a connectivity graph representation of a communication node of the communication system of FIG. 16;

FIG. 18 shows another embodiment of a message transmitted by a communication node of the communication system;

FIG. 19 shows another embodiment of a connectivity graph representation of a communication node of the communication system;

FIG. 20 is a diagrammatic representation of an exemplary communication system with asymmetrical links;

FIG. 21 shows a message transmitted by a communication node of the communication system of FIG. 20; and FIG. 22 shows a connectivity graph representation of a communication node of the communication system of FIG. 20.

DETAILED DESCRIPTION OF THE EMBODIMENTS

Figure 1:
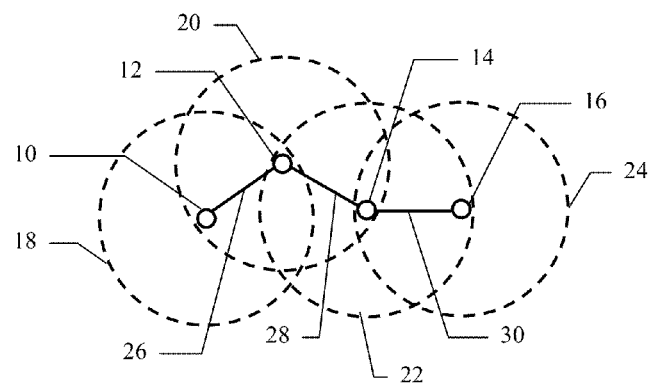
FIG. 1 is a diagrammatic representation of an exemplary communication system.

With reference again to FIG. 1, a communication system or network comprises a plurality of communication nodes such as nodes 10, 12, 14, 16. Communication nodes may also be termed stations or units or terminals.

Each communication node may be any fixed or mobile electronic appliance, such as a computer, a peripheral therefor, a handheld digital device like a personal digital assistant, a cell phone, a data collection device, a sensor for example for area videosurveillance, a router for such appliances and especially for videosurveillance appliances, and so on.

The communication nodes 10, 12, 14, 16 are connected by links 26, 28, 30. In the case of a wireless not directional communication, e.g. radio communication through not directional antennae, links are established by the transmission ranges 18, 20, 22, 24 of the communication nodes 10, 12, 14, 16. In case of wireless directional communication, e.g. radio communication through directional antennae or infrared communication, the transmission ranges reduce to cones or lines. In case of wired communication, electric wires, buses, optical fiber and similar form the links between communication nodes.

The links 26, 28, 30 allow for the communication nodes 10, 12, 14, 16 to communicate, i.e. to exchange any type of information, including video and voice data for any purpose.

Two communication nodes are said to be neighbors if there is a one-hop link between them. E.g., in FIG. 1 nodes 10 and 12 are neighbors to each other, as are nodes 12 and 14, and as are nodes 14 and 16. It is noted that also not neighbor nodes, such as nodes 10 and 14, nodes 12 and 16, and nodes 10 and 16, may communicate through the communication system, through multiple links or hops. According to embodiments of the present disclosure, the communication nodes 10, 12, 14, 16, or one selected node or selected ones among the communication nodes 10, 12, 14, 16, have hardware, software and/or firmware modules adapted to implement an automatic MAC protocol selection method, as disclosed below.

Figure 2:
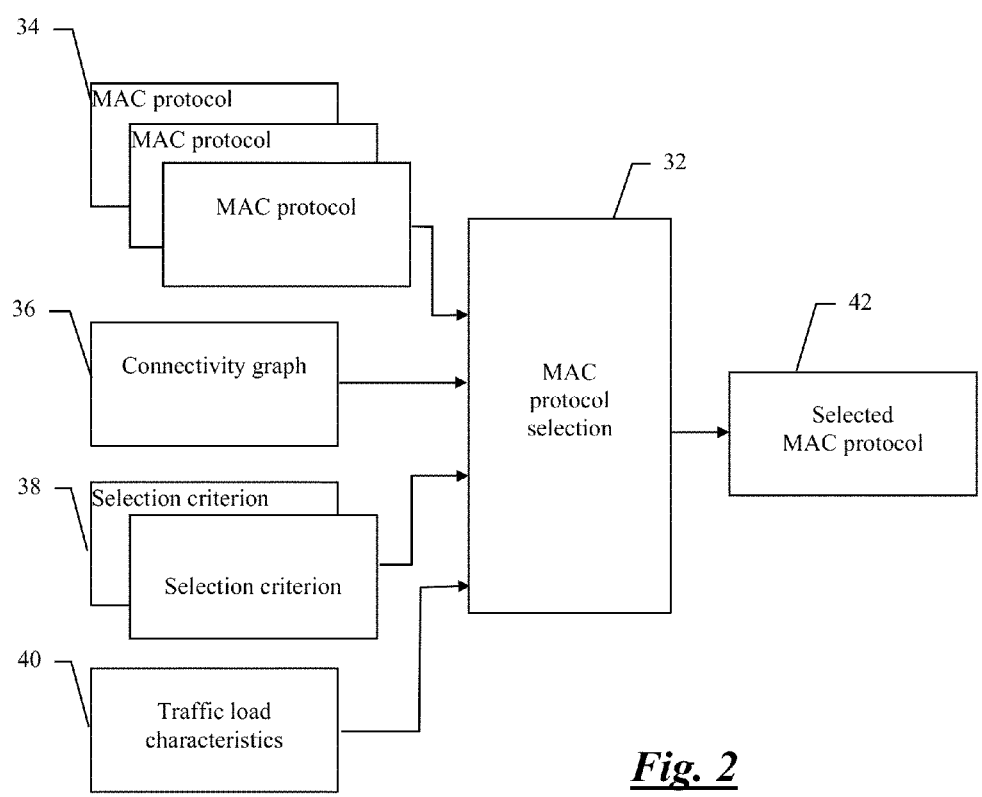
FIG. 2 is a diagrammatic representation of the automatic selection of a MAC protocol for a communication system.

FIG. 2 is a diagrammatic representation of the automatic selection of a MAC protocol for a communication system. Based on one or more of the following inputs:
a set 34 of the available MAC protocols,
the possibly time-variant connectivity graph 36 of at least part of the communication system's physical topology,
the selection criterion/criteria 38, and
the possibly time-variant function of the traffic load 40, or traffic load characteristics 40,
the most suitable MAC protocol 42 among those of set 34 is selected by block 32 and operated by the communication system.

It is noted that the above automatic selection of a MAC protocol for a communication system is not bound to any specific solution or system specification, e.g., it does not use specific MAC protocols only, and it does not optimize specific performance metrics only.

The method may be implemented in a centralized fashion within the communication system, i.e. by one selected communication node. In this case, the communication system overall is self-configuring.

However, the method can be implemented in a distributed fashion within the communication system, i.e. by each communication node thereof, so that each communication node is self-configuring.

There is no specific limitation to the number of MAC protocols of set 34. Moreover, the available MAC protocols set 34 can include all sort of different protocols to access the medium, or each channel where the medium is subdivided into two or more communication channels, e.g. by frequency division of a radio bandwidth.

For example, the available MAC protocols set 34 can include distributed protocols such as IEEE 802.11 DCF without RTS/CTS, Distributed Foundation Wireless MAC (DFW-MAC) and Elimination Yield-Non-Preemptive Priority Multiple Access (EY-NPMA) and/or distributed protocols with reservation such IEEE 802.11 DCF with RTS/CTS, as Busy Tone Multiple Access (BTMA), Floor Acquisition Multiple Access (FAMA), Floor Acquisition Multiple Access with Non-persistent Carrier Sensing (FAMA-NCS) and Floor Acquisition Multiple Access with Non-persistent Packet Sensing (FAMA-NPS), and/or centralized/hybrid ones such us Idle Sense Multiple Access (ISMA), Randomly Addressed Polling (RAP), Resource Auction Multiple Access (RAMA) and Disposable Token MAC Protocol (DTMP) and/or hybrid MAC protocols such as IEEE 802.11 PCF, Random Reservation Protocols (RRA), Packet Reservation Multiple Access (PRMA), Random Reservation Access-Independent Stations Algorithm (RRA-ISA).

The connectivity graph 36, i.e. the physical topology of at least part of the communication system or network, can be manually input by an installer via software into one or more communication nodes, or be hard-coded into one or more communication nodes by an installer or the manufacturer in case of communication systems that are highly planned.

The connectivity graph 36, if provided to selected node(s) only, may then be broadcasted by such node(s) over the communication system and retrieved by the other node(s) where the automatic MAC protocol selection method is implemented.

A secondary communication channel of the communication medium such as a lower frequency communication channel, or a communication system based on a different transmission technology than the technology used for communication over the medium which access is to be controlled by the MAC protocol to be automatically selected, e.g. a cellular-based communication system (GPRS, UMTS, etc.), may also be used for disseminating the connectivity graph 36.

The connectivity graph 36, or changes to the initially input or retrieved connectivity graph 36, can be automatically inferred by the communication system itself. The automatic inference can, again, take place either in a distributed manner, i.e. at each communication node, or in a centralized manner, i.e. at one or more selected communication node(s) only, and either on the same communication medium or channel, or on a secondary communication channel, or on a different communication system.

The complete automatic MAC protocol selection method may also be implemented over a communication channel or communication system other than that to be controlled by the MAC protocol to be automatically selected.

By way of an example and as more fully disclosed later, the automatic inference of the connectivity graph can be based on hello messages containing relevant information which are broadcasted by each node of the communication system. The hello messages can be implemented in several ways, and may include information related to the transmitter node itself and information related to the other nodes that the transmitter node has currently collected. The information related to the identity may include, e.g., a unique identifier such as the MAC address and/or the IP address of the nodes, and possibly other information such as hardware performance.

The selection criteria 38 can include e.g. the possibly time-variant function of performance parameter(s) to be optimized such as minimum delay, highest throughput, Quality of Service (QoS), also as a function of the type of traffic, whether it is requested to avoid possible conflicts among hidden/exposed nodes, other requirements of the nodes or custom rules input by the network administrator, etc.

Like the connectivity graph, also the selection criteria 38, e.g. the function and/or the parameter(s) to be optimized, can be either input to the communication node(s) through software or hard-coding, retrieved or downloaded from the communication system itself, or inferred by the communication node(s) by analyzing information such as type of traffic load, connectivity graph, communication system's logical topology, and similar The selection criteria 38 may be expressed in terms of the MAC performance, i.e. the MAC protocol selection method will automatically select, among the MAC protocol set 34, the MAC protocol 42 which performance parameter(s) better approximate(s) a theoretic upper bound.

The traffic load 40 characteristics can be inferred by the communication node(s) from the analysis of the actual incoming traffic or they can be defined a priori according to well-known traffic models.

The automatic MAC protocol selection method may operate at start-up. It may also be operated on a periodic basis, or whenever at least one input changes, e.g. whenever the MAC protocol set 34 and/or the selection criteria 38 and/or the traffic load 40 and/or the connectivity graph 36 changes for any reason.

The connectivity graph 36 changes whenever a communication node adds to or removes from the communication system. This may occur because a mobile node enters or exits the communication system area, or a mobile or fixed node is switched on or off, or fails. The connectivity graph 36 also changes whenever when a link is lost or established between nodes, e.g. when a mobile node moves within the communication system's area into or exits from the transmission range of other node(s), or the connection is lost because of break of a wire or optical fiber, interference from other appliances or magnetic fields, for physical interference in case of an IR link, or similar.

The automatic MAC protocol selection method can be repeated only upon a change becomes stationary, in order to disregard e.g. a link becoming temporarily unavailable.

Each communication node, on startup, can begin operating according to a default common MAC protocol, e.g. a distributed protocol (e.g. IEEE 802.11 DCF), or it can remain idle until the MAC protocol 42 is automatically selected by the method.

The automatic MAC protocol selection method may comprise an evaluation step, wherein the MAC protocols of set 34 are sequentially operated or simulated, for example, on time division basis. The actual or simulated traffic load characteristics 40 and/or statistics of the performance metrics to be optimized according to criteria 38 are collected, e.g., throughput, latency etc. Once the evaluation step is terminated, a MAC protocol 42 is selected, and the communication system is set to the operation step using the selected MAC protocol 42. Since both the traffic load 40 and the connectivity graph 36 may chance over time, the communication system can be periodically set back to the evaluation step to check the consistency of the current MAC protocol selection.

A selection criterion 38 can be based on the fact that the presence of hidden nodes may negatively affect the performance of the overall communication system. This information can be exploited to automatically select a suitable MAC protocol 42 so as to eliminate the hidden node problem, and thus, increase the communication system efficiency.

An embodiment of an automatic MAC protocol selection method using such a criterion, and especially of such a method as implemented in a distributed manner in all communication nodes of the system having suitable modules, will be detailed hereinafter, with reference to FIGS. 3 to 10.

The set of input MAC protocols 34 consists of two protocols: a random access protocol, referred to hereinbelow as Distributed MAC protocol, for example similar to the IEEE 802.11 DCF, and a Centralized protocol, for example similar to the IEEE 802.16 or similar to the IEEE 802.11 PCF standard, where a communication node plays the role of Master or central controller of the communication system, and the other nodes become Slaves. Indeed, it is noted that the term Centralized MAC protocol includes herein hybrid MAC protocols, as far as they also require a master.

Specifically, the selection criterion 38 is based on the following performance optimization heuristics: in presence of hidden node(s), the communication system performance with random access distributed protocols is assumed to be lower than the performance of the communication system operating with a centralized MAC protocol, and vice versa. Note that the selection criterion 38 or optimization heuristics is assumed to be valid irrespective of the actual load and pattern of the traffic injected in the network, so that the traffic load 40 need not be an input of the MAC protocol selection method and modules.

Therefore, according to the above selection criterion 38, the communication node analyzes the connectivity graph 36, and selects a MAC protocol between the Distributed and the Centralized ones based on the connectivity graph 36.

Figure 3:
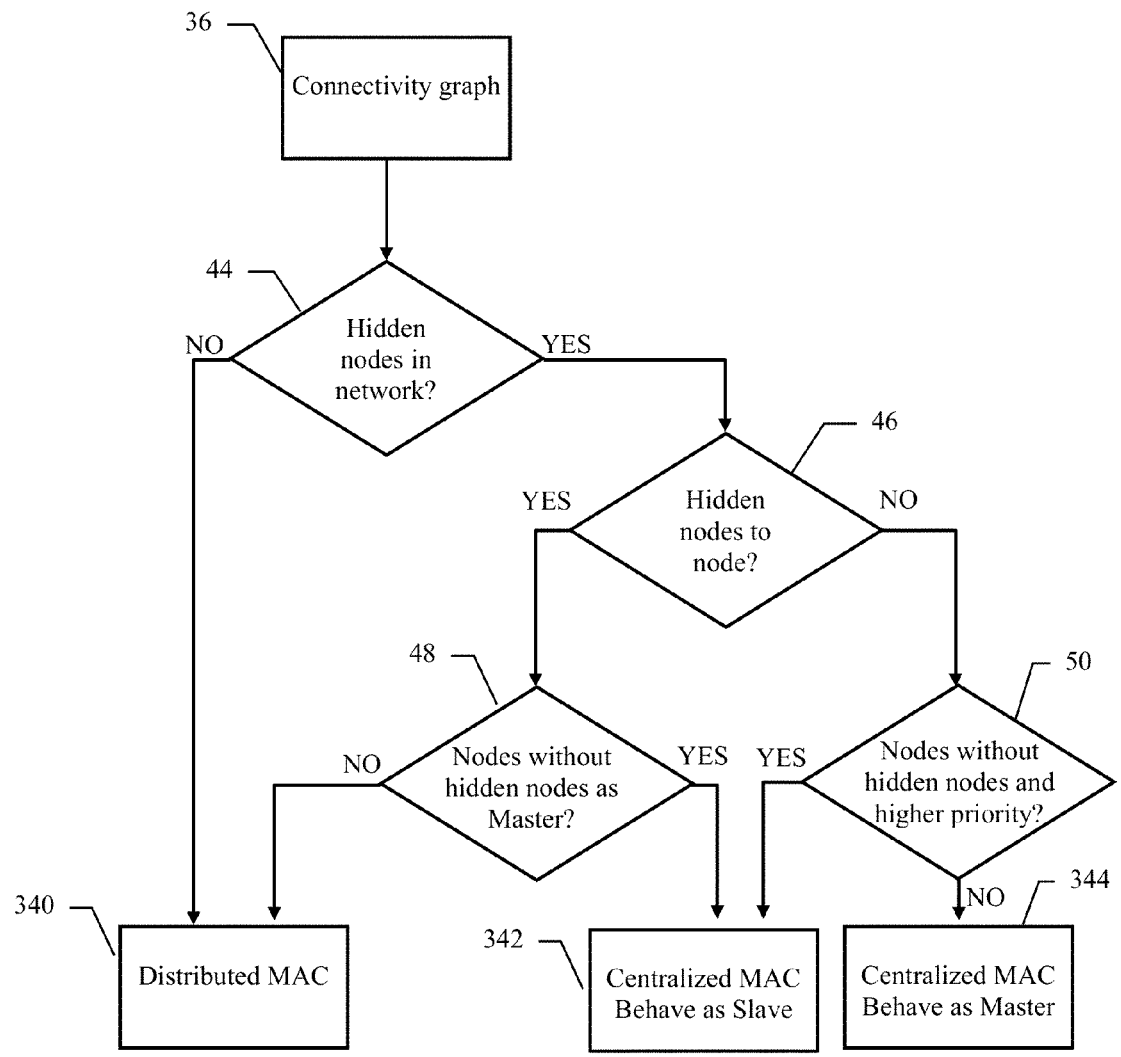
FIG. 3 is a flow chart of an embodiment of the automatic MAC protocol selection method.

More specifically, with reference to the block diagram of FIG. 3, in case no hidden node is detected, exit NO from block 44, the communication node will select and operate according to the Distributed MAC protocol 340.

If conversely hidden node(s) are detected by analyzing the connectivity graph 36, exit YES from block 44, the communication system should use the Centralized MAC protocol, provided that there is at least one node which does not suffer from the hidden node problem.

Thus, the communication node checks whether it can be Master by first checking in block 46 whether it has hidden nodes.

In case the node has hidden node(s), exit YES of block 46, it cannot be Master, and accordingly the communication node checks whether there is a candidate Master by checking in node 48 whether there is a node without hidden nodes.

In the negative case, the node will again select and operate according to the Distributed MAC protocol 340, while in the positive case it will select and operate according to the Centralized MAC protocol, behaving as a Slave (block 342).

If conversely the node has no hidden node(s), exit NO from block 46, it is a candidate Master, and accordingly the communication node checks whether there is a better candidate Master by checking in node 50 whether there is/are another node(s) without hidden nodes, which has/have a higher priority to act as Master.

In the positive case, the node will again select and operate according to the Centralized MAC protocol, behaving as a Slave (block 342), while in the negative case it will select and operate according to the Centralized MAC protocol, behaving as Master (block 344).

In order to establish a priority to act as Master in case of more than one node having no hidden nodes, several additional criteria may be used, such as the hardware performances, the traffic load, the MAC address, etc.

Alternatively, the first node recognizing that there are hidden node(s) within the communication system, and that it has none (exit NO from block 46) will be the Master.

In case the MAC protocol selection method is implemented in a centralized manner in the communication system, i.e. by a selected node(s) only, that selected node(s) may also randomly pick up one of the candidates as Master.

In this case of centralized method, it will be understood that the checks of blocks 44, 46, 48, 50 might be performed in a different order, and suitably repeated.

As said above, initially all the communication nodes may operate according to the Distributed protocol or using the Centralized protocol where Master or Slaves are either elected automatically, set at random or hard-coded, or remain idle.

Each communication node having MAC protocol selection modules to implement the MAC protocol selection method knows or is able to learn the possibly time-variant connectivity graph, as detailed above.

It is noted that based on the connectivity graph change occurred, both the MAC protocol and/or the node roles (master/slave) can potentially change.

Figure 4:
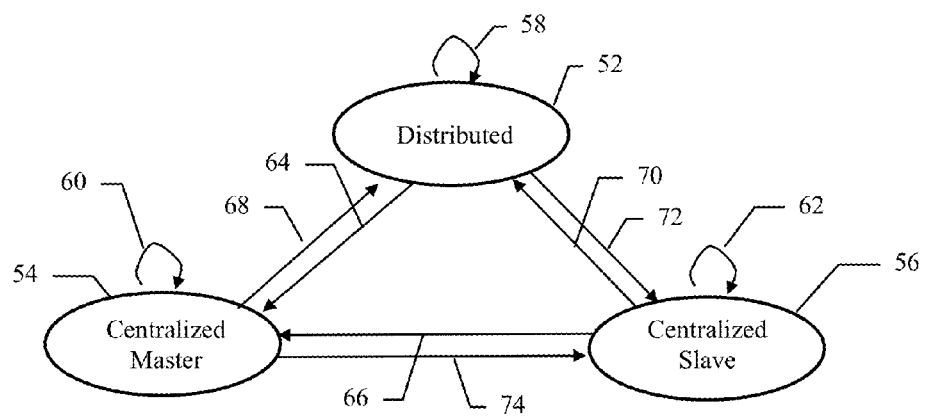
FIG. 4 shows a finite state machine of a communication node implementing the method of FIG. 3.

FIG. 4 shows a finite state machine to graphically describe the operating states of a communication node of a system implementing the above automatic MAC protocol selection method, and the transitions between states following a change in the communication system's physical topology or connectivity graph.

The communication node or machine has three states:
  state 52, Distributed MAC protocol is operated,
  state 54, Centralized MAC protocol is operated, the node behaves as Master; and
  state 56, Centralized MAC protocol is operated, the node behaves as Slave.

The transitions between states 52, 54, 56 following a change in the communication system's physical topology or connectivity graph are as follows:
  transition 58: the node is operating the Distributed MAC protocol in state 52 and continues after the change since:
    the communication system is or becomes a fully connected graph, OR
    there is (still) no communication node having no hidden nodes;
  transition 60: the node is operating the Centralized MAC protocol acting as Master in state 54 and continues after the change since:
    there are still hidden nodes within the communication system, AND
    it still has no hidden nodes, AND
    it still has the highest priority among communication nodes having no hidden nodes;
  transition 62: the node is operating the Centralized MAC protocol acting as Slave in state 56 and continues after the change since:
    there are (still) hidden nodes within the communication system, AND
    the node has (still) hidden nodes, OR
    it has (still) no hidden nodes, but there is (still) a higher priority node having no hidden nodes;
  transition 64: the node is operating the Distributed MAC protocol node and switches to the Centralized MAC protocol assuming the role of Master since:
    there are (now) hidden nodes in the communication system, AND
    it has no hidden nodes, AND
    its priority among communication nodes having no hidden nodes is or becomes the highest;
  transition 66: the node is operating the Centralized MAC protocol as Slave and becomes Master since:
    it (now) has no hidden nodes AND
    its priority among communication nodes having no hidden nodes becomes the highest;

transition 68: the node is operating the Centralized MAC protocol as Master and switches to the Distributed MAC protocol since:
   the communication system's topology becomes a fully connected graph, OR
   it now has hidden node(s) AND
   there is no node having no hidden nodes;
transition 70: the node is operating the Centralized MAC protocol as Slave and switches to the Distributed MAC protocol since:
   the communication's system topology becomes a fully connected graph, OR
   there are no more nodes having no hidden nodes;
transition 72: the node is operating the Distributed MAC protocol and switches to the Centralized MAC protocol acting as Slave since:
   the node has (now) hidden nodes AND
   there is a node having no hidden nodes OR
   there are (now) hidden nodes within the communication system, AND
   it has no hidden nodes, but there is a higher priority node having no hidden nodes;
transition 74: the node is operating the Centralized MAC protocol as Master and becomes Slave since:
   the node has now hidden nodes, OR
   there is now a higher priority node having no hidden nodes.

Several solutions can be envisaged to build the connectivity graph, and any technique well known in the art may be used. As said above, the connectivity graph can be inferred in a distributed manner, by means of hello messages which are broadcasted by each communication node. The hello messages can be broadcasted periodically.

Figure 5:
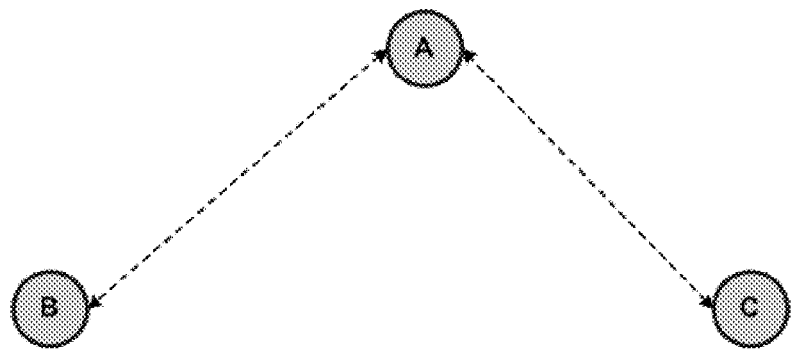
FIG. 5 shows another exemplary communication system.
Figure 6:
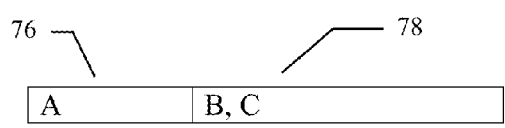
FIG. 6 shows a message transmitted by a communication node of the communication system of FIG. 5.

Each hello message can include, but it is not limited to, the following information, as shown in FIG. 6 for the hello message transmitted from communication node A of the exemplary communication system shown in FIG. 5:
   a unique identifier 76 of the transmitter node, and
   a list 78 of unique identifiers of every neighbor node of the transmitter node. Each hello message may also include nested lists of neighbors (i.e., lists of unique identifiers of each neighbor of each neighbor of the transmitter node, etc.), so that a connectivity graph of plural hops or of the whole communication system can be inferred at any communication node.

The unique identifiers 76 and 78 can be of any kind, and can comprise IP addresses and/or MAC addresses. The hello messages may also comprise information used as additional criterion in the master election, such as hardware version and similar.

Each communication node can then implement a List of Neighbors (LoN) table which is used to store the information received in the hello messages. The List of Neighbors (LoN) table represents the connectivity graph of the communication node within the system.

Figure 7:
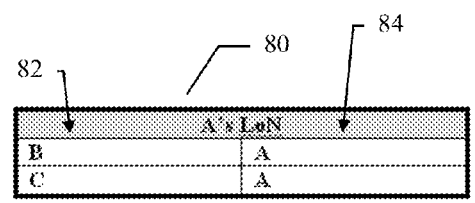
FIG. 7 shows a connectivity graph representation of a communication node of the communication system of FIG. 5.

The List of Neighbors (LoN) table 80 of communication node A of the communication system of FIG. 5 is shown in FIG. 7 by way of an example. It has one record for every neighbor B, C of communication node A, each record storing the information contained in the hello message transmitted by the corresponding neighbor B, C, i.e. in a field 82 the unique identifier of the neighbor, and in a field 84 the list of unique identifiers of each neighbor of the neighbor. The unique identifiers are represented by the same letters A, B, C as the nodes in FIG. 7 and similar FIGs. thereafter for the sake of simplicity. Also, for the sake of simplicity, the priority criterion in master election will be assumed to be that of the lowest unique identifier in alphabetical order in the examples discussed hereinbelow.

Each communication node takes decisions based on its local LoN table or connectivity graph 80 only. The table is assumed to be updated according to the following table management mechanism: the table is modified only after the communication system's topology is assumed to be stable. Any detected topology change can be held pending using e.g. a temporary update LoN table or temporarily storing the hello messages having information different from the corresponding record in the LoN table 80. The communication system's topology is considered stable, e.g., as soon as N hello messages reporting the same communication system's topology modification are successfully received, or after a predetermined period of time without receiving any hello message changing the connectivity graph, or without receiving any hello message at all.

As seen above, the election of the Master of the Centralized MAC protocol may be based on the consideration that, in presence of hidden node(s) in a communication system, any node which is not subject to the hidden node problem is a candidate to play the role of Master. If more than one node satisfy this condition, any additional priority criterion amongst the candidates can be used to break the tie, as stated above.

It will however be understood that any leader election mechanism well known in the networking literature may also be used, for example cited in Vasudevan, S.; Kurose, J.; Towsley, D., "Design and Analysis of a Leader Election Algorithm for Mobile Ad Hoc Networks", Proceedings of the 12th IEEE International Conference on Network Protocols (ICNP'04) (2004), or in Basagni, Bruno, Mambrini, Petrioli, "Comparative Performance Evaluation of Scatternet Formation Protocols for Networks of Bluetooth Devices", Wireless Networks, Volume 10, Number 2, March 2004, pp. 197-213, both incorporated herein by reference in their entirety.

Figure 8:
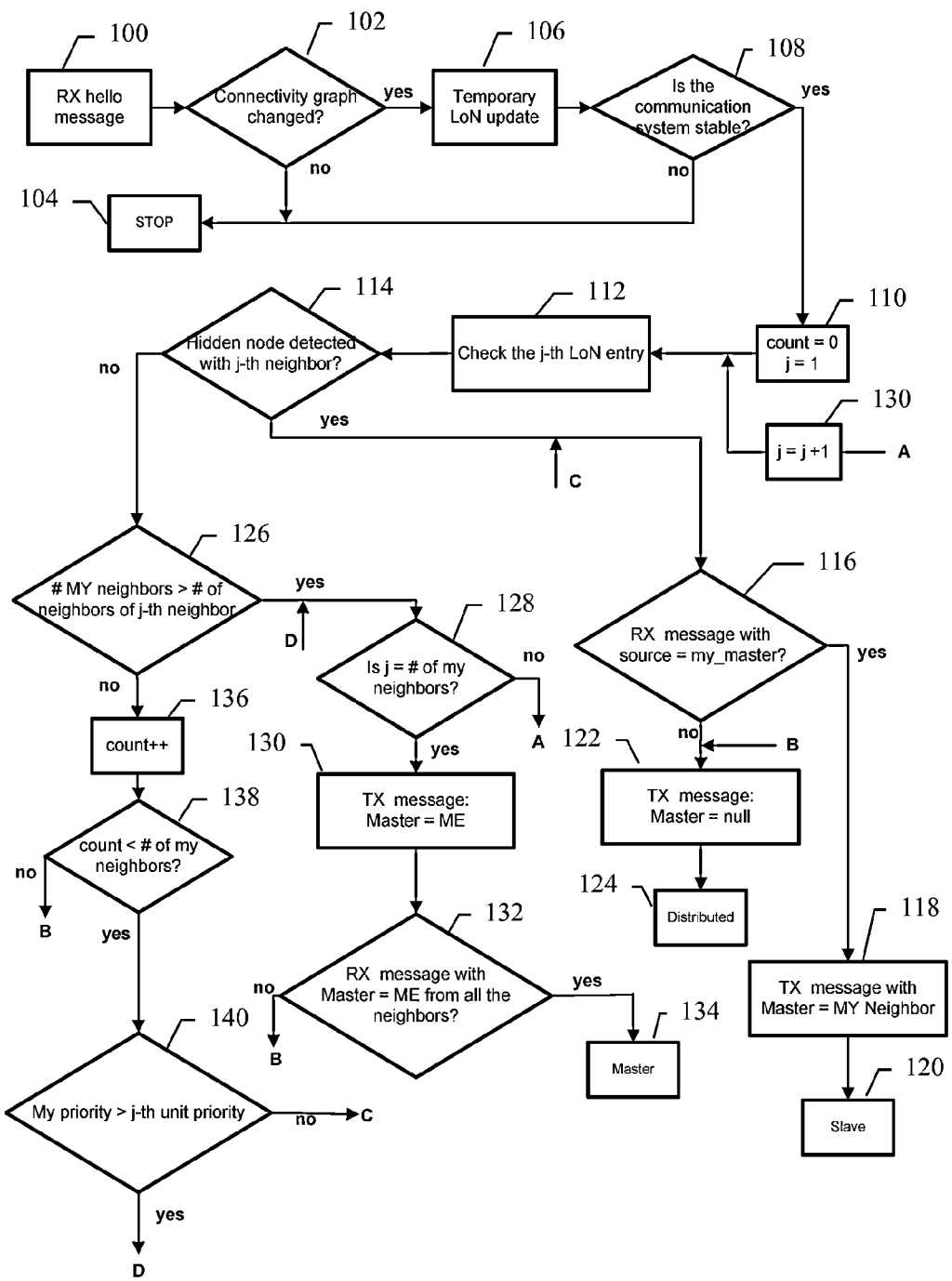
FIG. 8 is a more detailed exemplary flow chart of the embodiment of the automatic MAC protocol selection method of FIG. 3.

FIG. 8 shows a more detailed flow chart of an embodiment of the automatic MAC protocol selection method of FIG. 3, as implemented in a distributed manner by automatic MAC protocol selection modules of each communication node. The automatic MAC protocol selection method includes both the connectivity graph determination through hello messages exchange, and the role election procedure in case a Centralized MAC protocol is selected.

As can be seen, the reception of an hello message from a neighbor in block 100 triggers the method. The hello message is compared with the contents of the local LoN table 80 in block 102, and if no connectivity change is detected (exit NO of block 102), the method ends in block 104. If conversely (exit YES of block 102) a connectivity change is detected in block 102, the LoN table 80 is temporarily updated in block 106, e.g. by making a temporary copy thereof, in order to check in block 108 whether the change in the connectivity leads to a stable communication system, or the event is only transitory. If the communication system is not considered stable (exit NO of block 108), the method ends in block 104.

If conversely (exit YES of block 108) the communication system has stably changed, the communication node inspects the LoN table 80 rows to verify the presence of hidden node(s). More precisely, in block 110 a pointer j to the LoN table is initialized to 1, and an auxiliary variable count is initialized to 0. The j-th row of the LoN table 80 is then read in block 112 and in block 114 it is checked whether a hidden node is detected with the j-th neighbor.

As previously stated, each row or record of the LoN table contains, in a first field 82, a unique identifier of a neighbor of the communication node running the automatic MAC protocol selection method, and, in a second field 84, a list of the neighbors of said neighbor. The check of block 114 thus amounts to check each item of the list 84 of the j-th row against the unique identifier of the communication node running the automatic MAC protocol selection method itself, and against the first field 82 of each row of the LoN table 80. If an item of the list 84 is not found in the first field 82, and does not correspond with the unique identifier of the communication node running the automatic MAC protocol selection method itself, then a hidden node is detected.

In presence of hidden nodes, exit YES of block 114, the communication node running the automatic MAC protocol selection method can select the Centralized MAC protocol, acting as a Slave. Accordingly, in block 116, it checks the arrival of a message from a communication node offering to be Master. Such a message can e.g. be awaited for a predefined length of time. It is noted that the analysis of the connectivity graph or LoN table 80 is interrupted as soon as the node discovers having a hidden node in block 114, i.e. further rows of the LoN table 80 are not analyzed.

If such a message arrives, exit YES of block 116, the communication node running the automatic MAC protocol selection method sends an acknowledging message in block 118, and ends the automatic MAC protocol selection method selecting and operating according to the Centralized MAC protocol, acting as a Slave, in block 120.

If conversely no such message arrives, exit NO of block 116, the communication node running the automatic MAC protocol selection method may only select and operate according with the Distributed MAC protocol in block 124, preceded by sending out a message that there is no Master available in block 122.

On the other hand, in absence of hidden nodes with the j-th neighbor, exit NO of block 114, the communication node running the automatic MAC protocol selection method checks in block 126 whether it has more neighbors than the j-th neighbor.

The affirmative case, exit YES of block 126, means that at least the j-th neighbor has hidden node(s), so that the better performing Centralized MAC protocol should possibly be selected, and the master election should take place. The communication node running the MAC protocol selection method is a candidate Master with respect to the j-th neighbor. It thus checks in block 128 whether this is the last neighbor.

In case this is not the last neighbor, exit NO of check block 128, it continues the analysis of the connectivity graph, by incrementing pointer j in block 130 and returning then to block 112.

In case the communication node running the automatic MAC protocol selection method has no hidden nodes with all its neighbors, exit NO of all executions of block 114, and has the greatest number of neighbors, exit YES of all executions of block 126, and exit YES of the last execution of block 128, it will eventually run block 130, wherein it candidates as Master by broadcasting a proper message.

The node then in block 132 checks the arrival of an acknowledging message from all nodes of the communication system, accepting it to be a Master. Such a message can be awaited e.g. for a predefined length of time.

If such a message arrives, exit YES of block 132, the communication node ends the automatic MAC protocol selection method selecting and operating according with the Centralized MAC protocol, acting as a Master, in block 134.

If conversely no such messages arrives, exit NO of block 132, the communication node running the automatic MAC protocol selection method may again only select the Distributed MAC protocol in block 124, preceded by sending out a message that there is no Master available in block 122.

On the other hand, if the two nodes have the same neighbors, exit NO of block 126, at least as far as the j-th neighbor is concerned, the better performing Distributed MAC protocol should be selected. In the latter case, the counter variable count is thus incremented in block 136, and it is checked in block 138 whether the counter variable count is less than the number of neighbors.

In the affirmative case, exit YES of block 138, the communication node running the MAC protocol selection method checks in block 140 whether it has a higher priority than the j-th node, applying any additional criterion as detailed above. Indeed, while the connectivity graph is being analyzed, there is still the possibility of having to ultimately select the Centralized MAC protocol because of hidden nodes within the communication system.

Thus, if the communication node running the automatic MAC protocol selection method has a higher priority than the j-th node, exit YES of block 140, it passes to the above described block 128 of the branch that may possibly end with selection of Centralized MAC protocol, the node acting as a Master, or with selection of the Distributed MAC protocol.

Conversely, if the communication node running the automatic MAC protocol selection method has a lower priority than the j-th node, exit NO of block 140, it passes to the above described block 116 of the branch that may possibly end with selection of Centralized MAC protocol, the node acting as a Slave, or with selection of the Distributed MAC protocol.

If the counter variable count is equal to the number of neighbors of the communication node running the automatic MAC protocol selection method, exit NO of block 138, all communication nodes have the same number of neighbors, i.e. the connectivity graph is fully connected. Accordingly, the communication node ends the automatic MAC protocol selection method selecting and operating according with the Distributed MAC protocol in block 124, preceded by sending out a message that there is no Master available in block 122.

It will be seen that if the communication node running the automatic MAC protocol selection method has no hidden nodes with all its neighbors, exit NO of all executions of block 114, the same number of neighbors as one or some of its neighbors (exit NO of block 126), and a greater number of neighbors than the other neighbor(s) (exit YES of block 126), the counter variable count will not reach the number of neighbors, and thus the communication node running the automatic MAC protocol selection method will eventually arrive at block 130.

Although not strictly necessary, the exchange of the acknowledging messages in blocks 116 and 118 allows the proper MAC protocol to be automatically selected even if the connectivity graph of only part of the communication system is analyzed through the local LoN table 80. Moreover, it allows the times when the communication nodes start to operate according to the selected MAC protocol to be synchronized, irrespectively of possible differences in the individual running times of the method.

By way of an example, consider the automatic MAC protocol selection method as run by communication node A of the communication system of FIG. 5, considered stable, the LoN table 80 being that shown in FIG. 7.

When considering neighbor B, i.e. when j=1, no hidden node will be detected in block 114 (exit NO) because neighbor B has only neighbor A itself; communication node A has more neighbors, exit YES of block 126. When then considering neighbor C, i.e. when j=2, again no hidden node will be detected in block 114 (exit NO) because it has only neighbor A itself; and again communication node A has more neighbors, exit YES of block 126. Since this is the last record of the LoN table 80, exit YES of block 128, communication node A will candidate as Master in block 130.

When the MAC protocol selection method is run by communication node B, respectively C, it will discover hidden node C, respectively B, with respect to its neighbor A, exit YES of block 114, and thus will await for a message from the candidate Master, communication node A, in block 116.

Thus, the Centralized MAC selection protocol will eventually be selected, with node A acting as a Master, and nodes B and C acting as Slaves.

Figure 9:
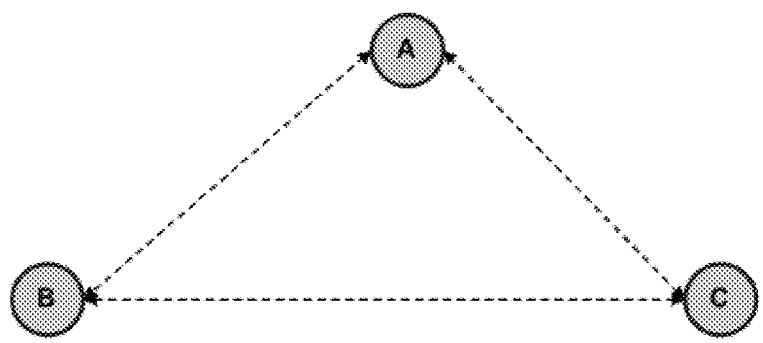
FIG. 9 shows another exemplary communication system.
Figure 10:
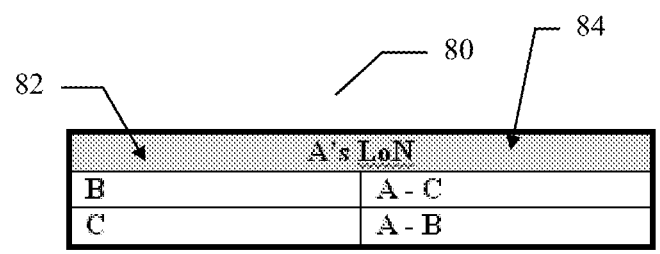
FIG. 10 shows a connectivity graph representation of a communication node of the communication system of FIG. 9.

By way of a further example, consider the MAC protocol selection method as run by communication node A of the communication system of FIG. 9, considered stable, the LoN table 80 being that shown in FIG. 10.

When considering neighbor B, i.e. when j=1, no hidden node will be detected in block 114 (exit NO) because it has neighbor A itself, and neighbor C that is neighbor to node A also. Communication node A has however the same number of neighbors as node B, exit NO of block 126. It thus increments counter count to 1 in block 136, which is less than the number of its neighbors, exit YES of block 138. Because node A running the method has a higher priority than node B, exit YES of block 140, it will consider also neighbor C (exit NO of block 128). When j=2, again no hidden node will be detected in block 114 (exit NO) because it has only neighbor A itself; and again communication node A has the same number of neighbors as node C, exit NO of block 126. It thus increments counter count to 2 in block 136, which is equal to the number of its neighbors, exit NO of block 138. Thus all nodes of the communication system have the same number of neighbors, i.e. there is no hidden node. The connectivity graph is thus fully connected, and the check of the additional criterion is needless to be performed. Communication node A selects the Distributed MAC protocol in block 124, preceded by sending out the message that there is no Master available in block 122.

When the MAC protocol selection method is run by communication node B, on the other hand, if it first considers the record relating to its neighbor A, the additional criterion of priority will not be satisfied, exit NO of block 140. Communication node B will thus await for a message from a candidate Master in block 116 and, since none will be received, will also select the Distributed MAC protocol in block 124. Note that even if node B first considers the record relating to its neighbor C, against which it has a higher priority, it will eventually select the Distributed MAC protocol in block 124 because counter variable count will be set to two, the number of its neighbors. Similarly, it will be seen that communication node C will also select the Distributed MAC protocol in block 124.

In the above embodiment of the MAC selection method it is assumed that, in presence of hidden nodes, whenever there is not any candidate to play the role of Master, i.e. all the nodes suffer from the hidden node problem, the communication system is operated according to the Distributed MAC protocol. Overall, this is clearly suboptimal but, nonetheless, this is the best solution available when the MAC protocols set 34 provided as input only contains a Centralized MAC protocol and a Distributed MAC protocol.

However, several strategies are known to mitigate the hidden node problem when operating a distributed MAC protocol by means of exchange of control messages amongst the nodes. For example, as discussed in the introductory portion of the present disclosure, the IEEE 802.11 standard itself incorporates an optional mechanism of medium reservation, based on RTS/CTS messages exchange.

An embodiment of a MAC protocol selection method using such a mechanism, and especially of such a method as implemented in a distributed manner in each communication node of the system having suitable modules, will be detailed hereinafter, with reference to FIGS. 11 to 17. For the sake of brevity, only differences with respect to the previous embodiment will be discussed, and same reference numbers will be used to refer to same or similar items.

The set of input MAC protocols 34 now comprises, besides the Distributed and Centralized MAC protocols, a Distributed MAC with Reservation protocol, for example similar to the IEEE 802.11 DCF standard protocol.

The MAC protocol selection criterion 38 is then modified so that, in presence of hidden node(s), if no Master candidates are available, the Distributed with Reservation MAC protocol is automatically selected. Again, the selection criterion 38 is valid irrespective of the actual load and pattern of the traffic injected in the communication system.

Figure 11:
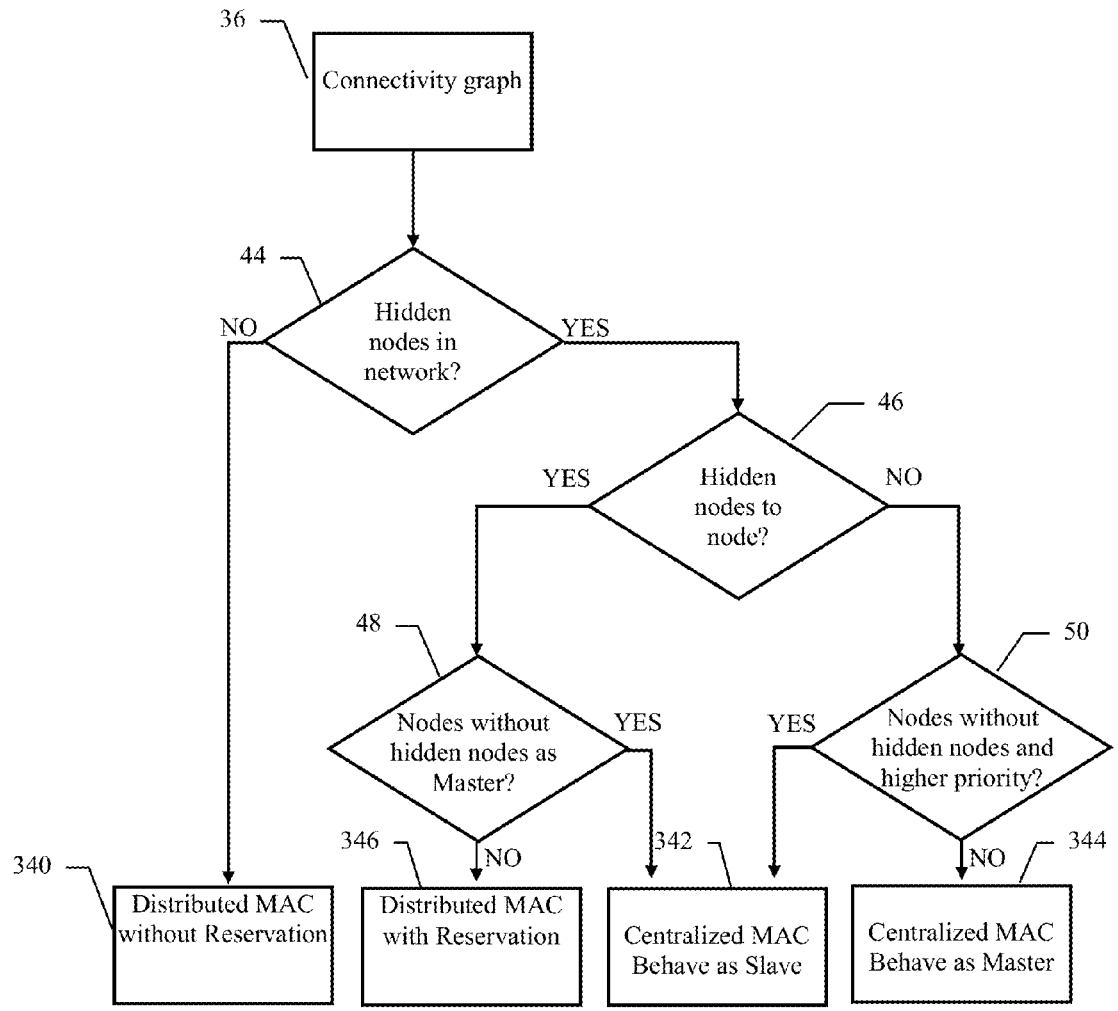
FIG. 11 is a flow chart of another embodiment of the automatic MAC protocol selection method.

More specifically, the block diagram of FIG. 3 is modified according to FIG. 11 in that, in case there are hidden nodes in the communication system (exit YES of block 44), and in the communication node running the MAC protocol selection method (exit YES of block 46), but no Master is available (exit NO of block 48), the Distributed MAC with Reservation protocol is selected in block 346. The Distributed MAC protocol 340, without Reservation, is only selected if there is no hidden node in the communication system overall, exit NO of block 44.

Figure 12:
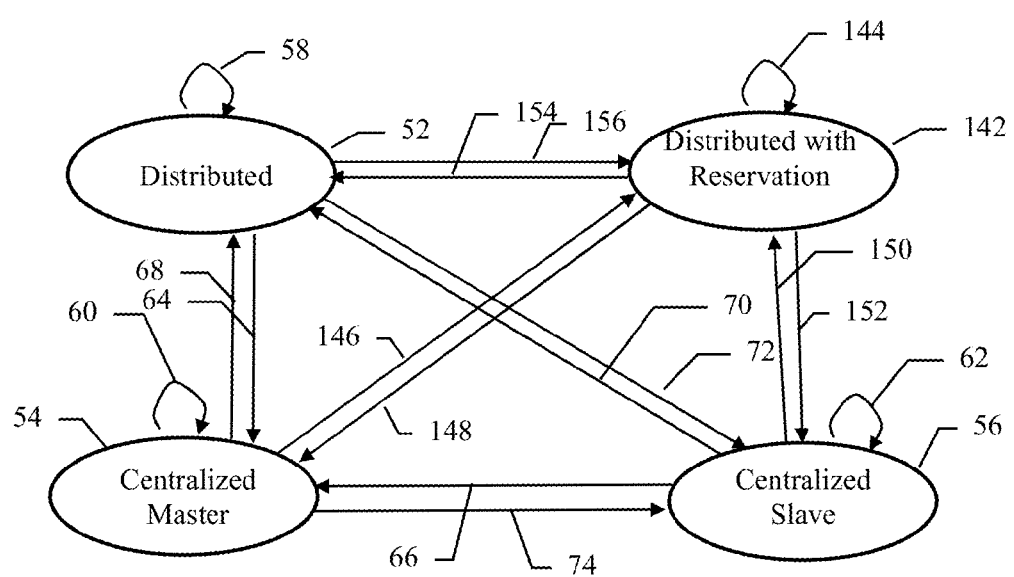
FIG. 12 shows a finite state machine of a communication node implementing the method of FIG. 11.

Similarly to FIG. 4, FIG. 12 shows a finite state machine to graphically describe the operating states of a communication node of a system implementing the above automatic MAC protocol selection method, and the transitions between states following a change in the communication system's physical topology or connectivity graph.

Besides states 52, 54 and 56, the communication node or machine has a fourth state:
state 142, Distributed MAC with Reservation protocol is operated.

The transitions 60, 62, 64, 66, 72, 74 occur as detailed above.

The remaining transitions between states 52, 54 and 56 are slightly modified as follows:
transition 58: the node is operating the Distributed MAC protocol in state 52 and continues after the change since:
the communication system is still a fully connected graph;
transition 68: the node is operating the Centralized MAC protocol as Master and switches to the Distributed MAC protocol since:
the communication's system topology becomes a fully connected graph;
transition 70: the node is operating the Centralized MAC protocol as Slave and switches to the Distributed MAC protocol since:
the communication's system topology becomes a fully connected graph;
Moreover, the transitions between state 142 and states 52, 54 and 56 are as follows:
transition 144: the node is operating the Distributed MAC with Reservation protocol in state 142 and continues after the change since:
there are still hidden nodes, AND
there is still no node having no hidden nodes;

transition 146: the node is operating the Centralized MAC protocol as Master and switches to the Distributed MAC with Reservation protocol since:
the node has now hidden nodes, AND
there is no other node having no hidden nodes;
transition 148: the node is operating the Distributed with Reservation protocol and switches to the Centralized MAC protocol acting as Master since:
it has no more hidden nodes, AND
it has the highest priority among nodes having no more hidden nodes;
transition 150: the node is operating the Centralized protocol acting as a Slave, and switches to the Distributed MAC with Reservation protocol since:
there is no more node having no hidden nodes;
transition 152: the node is operating the Distributed MAC with Reservation protocol, and switches to the Centralized MAC protocol acting as a Slave since:
there are still hidden nodes within the communication system, AND
it has hidden nodes, AND there is a node having no hidden nodes; OR
it has no hidden nodes, but there is a higher priority node having no hidden nodes;
transition 154: the node is operating the Distributed MAC with Reservation protocol, and switches to the Distributed MAC protocol since:
there are no more hidden nodes in the communication system;
transition 156: the node is operating the Distributed MAC protocol, and switches to the Distributed MAC with Reservation protocol since:
there are now hidden nodes in the communication system, AND
there is no node having no hidden nodes.

Figure 13:
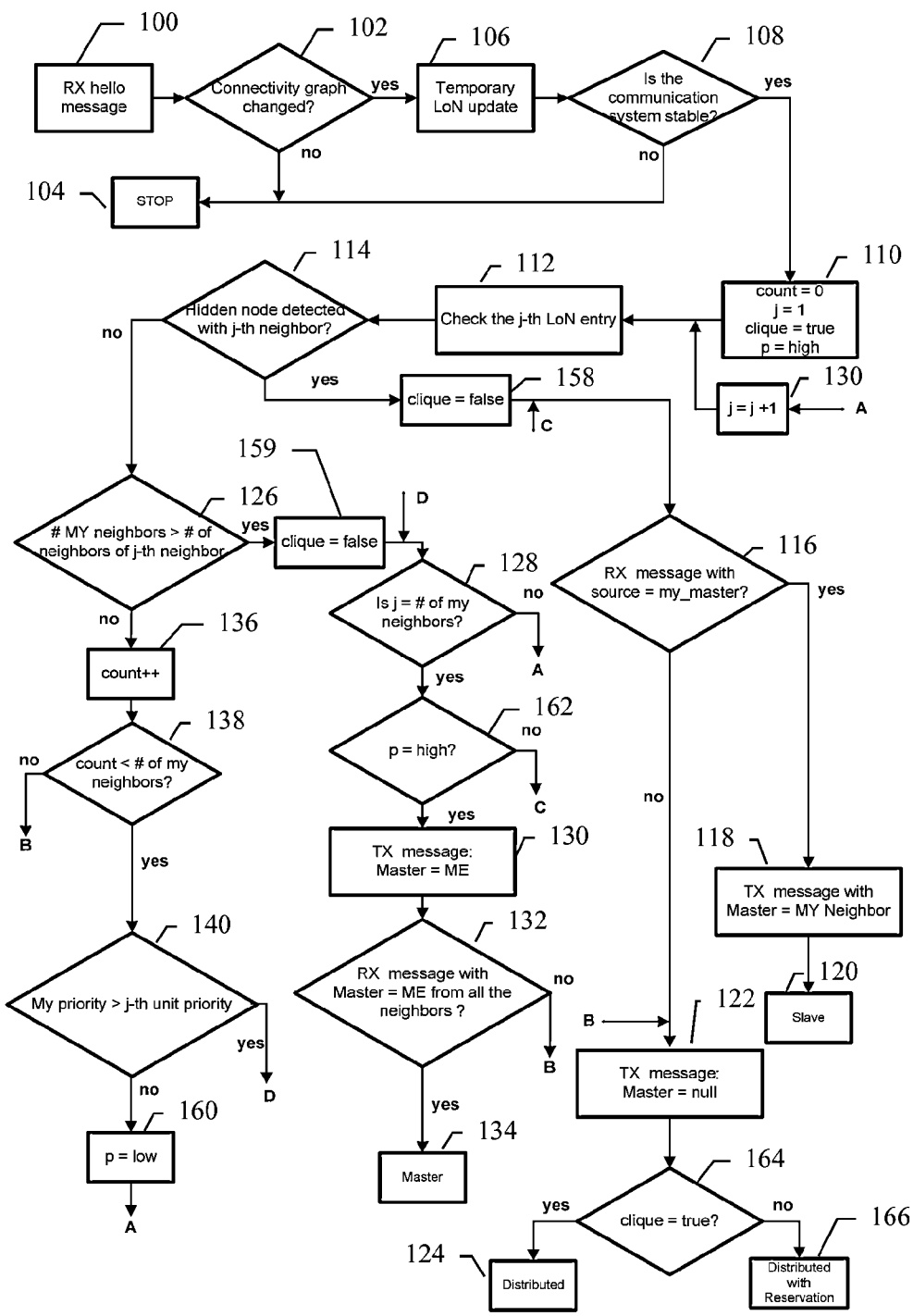
FIG. 13 is a more detailed exemplary flow chart of the embodiment of the automatic MAC protocol selection method of FIG. 11.

FIG. 13 shows a more detailed flow chart of the automatic MAC protocol selection method of FIG. 11, as implemented in a distributed manner by automatic MAC protocol selection modules of each communication node. For the sake of brevity, it will only be described in what differs from the flow chart of FIG. 8.

The method includes two other variables, a variable clique that is true when the connectivity graph is fully connected, and a variable p that represents the priority of the communication node running the automatic MAC protocol selection method, with respect to other candidate masters. The two variables are set to clique=true and p=high in initialization block 110.

Variable clique is set to false in block 158 in case hidden nodes are found with respect to the j-th neighbor, exit YES of block 114. Variable clique is also set to false in block 159 in case the communication node has a greater number of neighbors than the j-th neighbor, exit YES of block 126, because this means that the j-th neighbor has hidden nodes, and therefore the connectivity graph is not fully connected.

Variable p is set to low in block 160 in case the communication node running the automatic MAC protocol selection method has the same number of neighbors as neighbor j-th, but has a lower priority, exit NO of block 140. Moreover, in such a case, instead of going directly to block 116 waiting for a message from a possible candidate Master, the communication node running the automatic MAC protocol selection method continues the analysis of the connectivity graph by returning to block 130.

If, at the end of the analysis of the connectivity graph, exit YES of block 128, the communication node running the automatic MAC protocol selection method has found no hidden nodes with respect to none of its neighbors, it checks in block 162 whether its priority p is still high. Only in the affirmative case, exit YES of block 162, it candidates as Master going to block 130. Conversely, in the negative case, i.e. if its priority p is low, exit NO of block 162, it goes to block 116 waiting for a message from a possible candidate Master.

If the node receives no message from a candidate Master, exit NO of block 116, after sending out the message that there is no Master available in block 122, it checks in block 164 whether the variable clique is still set to true. Only in the affirmative case, exit YES of block 164, the node selects and operates according with the Distributed MAC protocol. Conversely, in the negative case, exit NO of block 164, the node selects and operates according with the Distributed MAC with Reservation protocol in block 166.

By way of an example, consider this embodiment of the automatic MAC protocol selection method as run by communication node A of the communication system of FIG. 14, considered stable, the LoN table 80 being that shown in FIG. 15.

When considering neighbor B, i.e. when j=1, no hidden node will be detected in block 114 (exit NO) because neighbor B has only neighbor A itself; communication node A has more neighbors, exit YES of block 126. Thus, communication node B has hidden node(s), and variable clique is accordingly set to false in block 159. When then considering neighbor C, i.e. when j=2, hidden node D will however be detected in block 114 (exit YES). Variable clique is again set to false in block 158.

Note that similarly, nodes B, and C will detect each other as hidden nodes when analyzing their neighbor A, and node D will detect hidden node A when analyzing its neighbor C. Thus, all nodes of the communication system will set their variables clique to false in block 158.

Because no communication node will accordingly receive any message from a candidate master (exit NO of block 116), the check of block 164 will be negative and the communication nodes will select the Distributed MAC with Reservation protocol in block 166.

By way of a further example, consider this embodiment of the automatic MAC protocol selection method as run by communication node A of the communication system of FIG. 16, considered stable, the LoN table 80 being that shown in FIG. 17.

When considering neighbor B, i.e. when j=1, no hidden node will be detected in block 114 (exit NO); communication node A has more neighbors, exit YES of block 126. Communication node B has thus hidden node(s) and variable clique is accordingly set to false in block 159. Also when then considering neighbor C, i.e. when j=2, no hidden node will be detected in block 114 (exit NO), communication node A has however the same number of neighbors as node C, exit NO of block 126. It thus increments counter count to 1 in block 136, which is less than the number of its neighbors, exit YES of block 138. Because node A running the method has a higher priority than node B, exit YES of block 140, it will consider also neighbor D (exit NO of block 128). When considering neighbor D, i.e. when j=3, no hidden node will be detected in block 114 (exit NO); communication node A has more neighbors, exit YES of block 126. Variable clique is again set to false in block 159. Since this is the last record of LoN table 80, exit YES of block 128, and the priority p remained high, exit YES of block 162, node A will candidate as Master and eventually select and operate according with the Centralized MAC protocol in block 134. If for any reason node A fails to receive the acknowledgement message from all nodes, exit NO of block 132, it will eventually select and operate according with the Distributed MAC with Reservation protocol in block 166 since variable clique has been set to false, exit NO of block 164.

Note that both nodes B and D, detecting each other as hidden nodes when analyzing either neighbor A or neighbor C, will transmit the message acknowledging A acting as Master in block 118. If for any reason such nodes B or D fail to receive the message from A candidating as Master, exit NO of block 116, they also will eventually select and operate according with the Distributed MAC with Reservation protocol in block 166 since in block 158 variable clique has been set to false.

Moreover, when the automatic MAC protocol selection method is run by communication node C, and neighbor A is being considered, the additional criterion of priority will not be satisfied, exit NO of block 140. It will thus set its priority p to low in block 160. At the end of the analysis of the connectivity graph, exit YES of block 128, the check of block 162 will thus be negative, and node C will receive the message from node A candidating as Master in block 116. If for any reason node C fails to receive the message from A candidating as Master, exit NO of block 116, it also will eventually select and operate according with the Distributed MAC with Reservation protocol in block 166 since in block 159 variable clique has been set to false in block 159 when nodes B and D have been considered.

Those skilled in the art will easily understand the changes to be made to the above embodiment when the MAC protocol set 34 only contains the Distributed MAC protocol, and the Distributed MAC with Reservation protocol.

Moreover, it is noted that further selection criteria 38 may be used to further select e.g. among more than one Centralized (or hybrid) MAC protocol selected in blocks 342, 344, 120, 134; among more than one Distributed MAC protocol selected in blocks 340, 124; among more than one Distributed MAC with Reservation protocol selected in blocks 346, 166.

In both the embodiment of the automatic MAC protocol selection method described with reference to FIGS. 3-10, and in the embodiment of the automatic MAC protocol selection method described with reference to FIGS. 11-17, it may be advantageous when information on the proposed Master, if any, is included in the hello messages themselves. This achieves lower traffic load and thus enhances the performance of the communication system.

In other words, each hello message will further comprise, as shown in FIG. 18, a further field 168 containing the unique identifier of the supposed Master. The LoN tables 80 may similarly contain a further field 170 for storing the proposed Master of each neighbor node, as shown in FIG. 19.

Thus, a communication node executing block 130 will insert its own unique identifier in field 168; a communication node executing block 118 will insert in field 168 the unique identifier of the candidate Master; a communication node executing block 122 will set field 168 to null. Communication nodes executing blocks 116, 132 will check the field 168 of the hello messages they receive, e.g. periodically, from the other communication nodes.

When the hello messages further contain information on the supposed Master, it will be understood that a change in the supposed Master should not be regarded as a connectivity graph change by a communication node executing block 102.

It is noted that the described automatic MAC protocol selection method is independent of the nature of the communication system, and of the physical requirements for a link to be established between two nodes, such as, in the case of a radio link, the minimum power that needs to be received from a neighbour node.

Moreover, in the previous description symmetrical links have been considered. Consider however the communication system of FIG. 20, comprising communication node 172 having transmission range 174, communication node 176 having transmission range 178, and communication node 180 having transmission range 182. Communication node 172 is hidden to communication node 176, although communication node 176 is not hidden to communication node 172.

FIG. 21 shows the hello message transmitted by communication node 172, and FIG. 22 shows the LoN table 80 of communication node 172.

It will be immediately recognized that the above described embodiments of the automatic MAC protocol selection method operate on asymmetrical links as well, i.e. the communication nodes will select the Distributed MAC protocol, possibly with Reservation.

Those skilled in the art will easily understand the changes to be made to the above embodiments when the selection criterion 38 indicates that a Centralized MAC protocol is to be selected whenever there is a node having no hidden nodes, even if the connectivity graph is fully connected.

It should be noted that the automatic selection of a MAC protocol according to embodiments of the present disclosure is not related to the specific MAC protocol itself.

The communication nodes may comprise a dedicated microchip MAC for each operating each MAC protocol of the set 34, or the MAC protocol(s) may be software programs suitably input to the communication node.

In the latter case, the specific MAC protocols of the set 34, or only the selected MAC protocol 42, may also be retrieved from the communication system itself, or provided through a secondary communication channel or system. Indeed, it is noted that the automatic MAC protocol selection method is not even sensitive to the actual MAC protocols, i.e. it does not need to know any detail thereof.

More in general, it will be understood that the teachings of the present disclosure are not subject to any specific implementation, and that several alternatives can be envisaged to implement the teachings of the disclosure according to the MAC protocol set 34 provided as input to the automatic MAC protocol selection method.

The invention claimed is:

1. A method of operating a communication system, comprising the steps of:
    a) providing at least one communication node of the communication system with a connectivity graph of at least part of the communication system, wherein the connectivity graph is constructed using a plurality of messages broadcasted by a plurality of issuing nodes in the communication system, each message comprising, for each issuing node, a unique identifier of the issuing node and a list of unique identifiers of each neighbor node of the issuing node,
    b) analyzing said connectivity graph at said at least one communication node,
    c) selecting a Medium Access Control (MAC) protocol at said at least one communication node from a set of at least two MAC protocols based on said analyzed connectivity graph, and
    d) operating said communication system with the selected MAC protocol;
wherein said connectivity graph comprises information for each neighbor node of the communication node, comprising a unique identifier of the communication node's neighbor node and a list of unique identifiers of each neighbor node of the neighbor node; and wherein said step of analyzing said connectivity graph comprises comparing each list of unique identifiers with (i) the unique identifier or identifiers of the communication node's neighbor node or neighbor nodes and (ii) a unique identifier of the communication node, and to qualify the connectivity graph as not fully connected in case at least one list of unique identifiers contains at least one unique identifier different from (i) the unique identifier or unique identifiers of the communication node's neighbor node or neighbor nodes and (ii) the unique identifier of the communication node.

2. The method according to claim 1, wherein the set of at least two MAC protocols includes at least one centralized MAC protocol.

3. The method according to claim 1, wherein the at least one communication node is a fixedly installed electronic appliance.

4. The method according to claim 1, wherein the at least one communication node is adapted to:
    receive a message from at least one neighbor node of the communication system, said message comprising a unique identifier of the communication node's neighbor node, and a list of unique identifiers of every neighbor node of the neighbor node, and
    store information comprised in messages received from all neighbor nodes of the communication node.

5. The method according to claim 1, wherein said at least one communication node is adapted to broadcast a message, said message comprising (i) a unique identifier of the communication node and (ii) a list of unique identifier(s) of every neighbor node of the communication node.

6. The method according to claim 1, wherein said connectivity graph is time-variant.

7. A method of operating a communication system, comprising the steps of:
    a) providing at least one communication node of the communication system with a connectivity graph of at least part of the communication system, wherein the connectivity graph is constructed using a plurality of messages broadcasted by a plurality of issuing nodes in the communication system, each message comprising, for each issuing node, a unique identifier of the issuing node and a list of unique identifiers of each neighbor node of the issuing node,
    b) analyzing said connectivity graph at said at least one communication node,
    c) selecting a Medium Access Control (MAC) protocol at said at least one communication node from a set of at least two MAC protocols based on said analyzed connectivity graph, and
    d) operating said communication system with the selected MAC protocol;
wherein said connectivity graph comprises information for each neighbor node of the communication node, comprising a unique identifier of the communication node's neighbor node and a list of unique identifiers of each neighbor node of the neighbor node; and wherein said step of analyzing said connectivity graph comprises comparing each list of unique identifiers with (i) the unique identifier or identifiers of the communication node's neighbor node or neighbor nodes and (ii) a unique identifier of the communication node, and to qualify the connectivity graph as fully connected in case no list of unique identifiers contains unique identifier(s) different from (i) the unique identifiers of the communication node's neighbor node or neighbor nodes and (ii) the unique identifier of the communication node.

8. The method according to claim 7, wherein the set of at least two MAC protocols includes at least one distributed MAC protocol without reservation.

9. The method according to claim 7, wherein the set of at least two MAC protocols includes at least one distributed MAC protocol with reservation.

10. The method according to claim 7, wherein the at least one communication node is a fixedly installed electronic appliance.

11. The method according to claim 7, wherein the at least one communication node is adapted to:
    receive a message from at least one neighbor node of the communication system, said message comprising a unique identifier of the communication node's neighbor node, and a list of unique identifiers of every neighbor node of the neighbor node, and
    store information comprised in messages received from all neighbor nodes of the communication node.

12. The method according to claim 7, wherein said at least one communication node is adapted to broadcast a message, said message comprising (i) a unique identifier of the communication node and (ii) a list of unique identifier(s) of every neighbor node of the communication node.

13. The method according to claim 7, wherein said connectivity graph is time-variant.

* * * * *